May 15, 1951 P. L. HOOVER 2,552,788
INAUDIBLE CONTROL CIRCUIT FOR STARTING AND STOPPING PHONOGRAPH SYSTEMS
Filed Oct. 29, 1946

INVENTOR.
PAUL L. HOOVER
BY
Oberlin & Limbach
ATTORNEYS

Patented May 15, 1951 2,552,788

UNITED STATES PATENT OFFICE 2,552,788

INAUDIBLE CONTROL CIRCUIT FOR STARTING AND STOPPING PHONOGRAPH SYSTEMS

Paul L. Hoover, Cleveland Heights, Ohio, assignor, by mesne assignments, to James Arthur Gleason, Cleveland, Ohio, as trustee Application October 29, 1946, Serial No. 706,352

13 Claims. (Cl. 179—100.1)

This invention relates to a sound reproducing device for reproducing recorded sounds and control means therefor.

As one illustrative embodiment of the invention, it is described herein as used for advertising programs wherein a plurality of different advertisements are recorded on a record and reproduced through a sound reproducer intermittently, beginning at predetermined regular intervals, regardless of the length of any particular recorded advertisement. For example, it is desirable in some instances to install a mechanism for this purpose on a public conveyance and to operate it automatically so that every five minutes successive ones of the recorded advertisements are commenced, even though each advertisement may be of about one-half minute duration.

To meet such requirements by the use of a continuously driven record with blank spaces between the successive advertisements would require a record beyond any practical size. With the present mechanism, the successive advertisements can be recorded on a record of average size with only a slight blank or idle space between successive recordations and the record operated only during the period in which an advertisement is to be reproduced and then stopped for the remaining portion of the period between commencement of advertisements. In this manner full advantage can be taken of a limited size of record even though advertisements of different lengths are recorded successively on the record.

Since it is generally desirable to use such mechanism on vehicles, the present invention is shown employing the so-called magnetic wire, or magnetic tape, recorder reproducer which is not affected by the vibrations usually encountered in moving vehicles, the use of ordinary phonographic type of voice recorders being satisfactory when such conditions are not to be met.

One of the principal objects of the present invention is to provide a mechanism for the purpose described and related purposes and in which a sound reproducing device, adapted to reproduce sound from a record, and including a record driving mechanism and means for starting the mechanism, is combined with a means which is rendered operative by predetermined changed condition in the vibrations produced by the device from the record to stop the device.

A more specific object is to provide a means for stopping the device and which is rendered operative for that purpose by a cessation of the reproduction of sounds from the record.

Another object is to provide a means for stopping the device and which is rendered operative by virtue of vibrations above the normal range reproduced by the device for advertising purposes.

Another object is to provide a record arranged for cooperation with the device and which has portions between successive recordations which either are blank and produce no tonal effects or produce vibrations above the range of frequencies normally employed in the recordations between which they are interposed.

Other objects and advantages will become apparent from the following descriptions wherein references are made to the drawings in which.

In the following description, the term "vibrations" is used in a broad sense including the actual vibrations produced by a record, or speaker, or the electrical impulses, translations or equivalents thereof.

Figure 1:
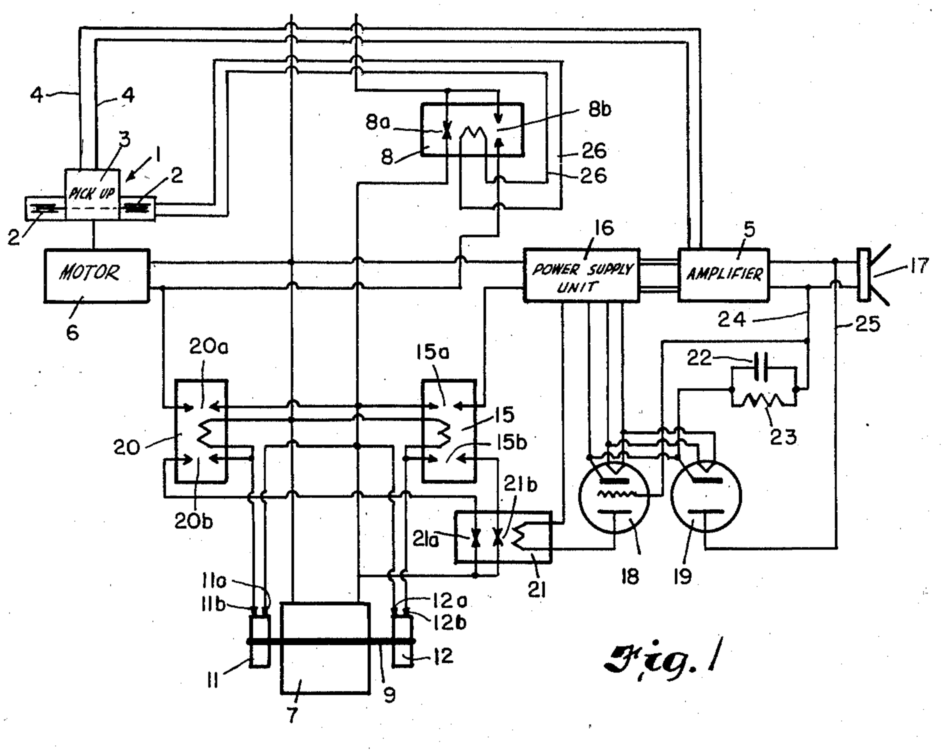
Figure 1 is a wiring diagram illustrating an embodiment of the invention in which the stopping of the record or mechanism results from a discontinuance of the reproduction of recorded sound.

Referring to Figure 1, the mechanism comprises a record operated sound reproducer 1 of the type generally available on the market. Such mechanism in general comprises cooperating reels 2, one of which serves to hold and rewind a magnetic tape or wire record and the other of which serves to wind the record off of the former and draw it through a suitable electric pickup device 3 from which wires or leads 4 extend to an amplifier 5, as will later be described. The reels 2 are driven by a main motor 6 to which power is supplied from the usual 110 volt, 60 cycle power line. In order to start the motor 6 and energize the reproducer intermittently at pre-selected intervals, a clock motor 7 is provided. The motor 7 is connected to the power line through the normally closed contacts 8a of a relay 8. The motor 7 has a rotatable shaft 9 which may be driven at any fixed speed desired.

In the illustrative example, the clock motor is one in which the shaft 9 rotates once in five minutes. The shaft 9 carries two cams 11 and 12, respectively. The cam 11 cooperates with two contact fingers 11a and 11b to close a circuit therebetween for fifteen seconds and then to open the circuit between the contacts 11a and 11b and maintain it open for 285 seconds. The cam 12, on the other hand, is arranged to close a circuit between the contacts 12a and 12b and maintain this contact for 45 seconds and then open the circuit between the contacts 12a and 12b for 255 seconds. The two cams are so synchronized that cam 12 operates to close its circuit first and to hold this circuit closed for 30 seconds before the cam 11 operates to close its circuit. Later the two cams break the circuits between the fingers 11a and 11b and between the fingers 12a and 12b, this breaking preferably occurring simultaneously about 15 seconds after the cam 11 has closed its circuit so that 285 seconds later the cycle will repeat, the clock-motor being continuously driven at uniform speed. Upon operation of the cam 12 to close the circuit between the fingers 12a and 12b, power is applied to the coil of a normally open relay 15 causing the relay to operate and close the contacts 15a and 15b thereof. Closing of the contact 15a applies the voltage of the power-line to the power supply unit 16 of the reproducing device. The power supply 16 in turn operates the amplifier 5, and therethrough a loud speaker 17. The power supply unit 16, the amplifier 5, the loud speaker 17, the main motor 6, the pickup 3, and the reels 2 are all part of the normal wire record reproducing machine and are not modified in any way, except to tap off some of the output on the power supply link 16 to supply operating voltages for a pair of thermionic tubes 18 and 19, the purpose of which is described hereinafter. Thus, when the cam 12 operates to close the circuit between the fingers 12a and 12b and energize the relay 15, the contacts 15a apply voltage to the entire wire recorder including its amplifier system. At the same time the power supply unit 16 supplies power to the thermionic tubes 18 and 19.

Thirty seconds after this operation the cam 11 closes the circuit between the fingers 11a and 11b and thereby operates a normally open relay 20 which, in turn, closes its contacts 20a and 20b. The contact 20a applies the line voltage to the main motor 6 so that the entire wire recorder system is in operation and any signals, speech, music or other vibrations picked up from the record are amplified by the amplifier 5 and passed through loud speaker 17. The contact 15b on the relay 15 is merely a holding contact and once the relay 15 operates, closing the contact 15b, a circuit is established through the normally closed contacts 21b of a relay 21. The circuit so established is a by-pass circuit around the contacts 12a and 12b. Thus once the relay 15 is operated it remains operated even though the contacts 12a and 12b open so long as the contacts 21b of the relay 21 do not open.

Similarly, the contact 20b of the relay 20 is merely a holding contact. The contacts 20b and 21a form a by-pass circuit around the contacts 11a and 11b so that relay 20 remains operative even though the contacts 11a and 11b open. Thus the clock motor is operative to turn on the power to the tubes and amplifying system on the reproducer thirty seconds before the main motor 6 starts so that the tubes and amplifier warm up to operating temperature before the reels 2 are driven to pass the wire through the pick-up 3.

As mentioned in the objects, it frequently happens that while it is desired to start the given advertisements intermittently, preferably at regular intervals, it is not always desirable to make each of the advertisements of the same length. Consequently, any timer which starts the operation of the device and cuts it off automatically at the end of a definite time period cannot be used to advantage. The only manner in which it could be used would be to make the "on" period of the device equal to the longest advertisement on the record, or to drive the record continuously. In both instances, an unduly long record would be required for a limited amount of time during which the advertisements actually were being reproduced. Accordingly, a control mechanism is arranged so as to stop the operation of the reproducer mechanism, or at least the main motor 6 upon a predetermined change in the condition of the vibrations produced by the device from the record.

One means of accomplishing this operation comprises the tubes 18 and 19 and the relay 21 and these elements function to maintain the system operative so long as speech is being reproduced. In event that the speech, or music, or whatever vibrations are being reproduced from the record cease for a predetermined interval, for example 2 seconds, the relay 21 operates to open the contacts 21a and 21b which, in turn, cause the relays 15 and 20 to drop out, thus shutting down the entire system until operation is reinitiated at the next five minute interval by the clock motor 7. Here it should be noted that the reproducer shown for illustrative purposes is one dependent upon thermionic tubes for amplification and, accordingly, it is necessary to allow a warm-up period for the tubes before initiating the speech or drive of the record unless the power supply and amplifier are left continuously in operation and only the main motor stopped. It is to provide this warm-up period that the contacts on the cams 11 and 12 hold the system operative for fifteen seconds even though no speed or music is on the wire. This also affords time for the main motor 6 to come up to speed before the reproduction of any sound. A period of fifteen seconds, though longer than required, assures that the motor 6 will be operating at the proper speed when speed or sounds are to be reproduced.

In order to render the tubes 18 and 19 operative for stopping the operation of the reproducer in response to a change in the condition of vibrations reproduced from the record, means may be provided responsive to the cessation of the reproduction of sound from the record. This shut-off means may comprise a condenser 22, resistance 23, the thermionic tube 19 which is a diode tube, the tube 18 which is an amplifier tube, and the relay 21. These elements are tapped in to the line preferably between the amplifier and loud speaker and by the leads 24 and 25 so as to pick up the voice, music or such other vibrations reproduced from the record. These are rectified by the diode or rectifier tube 19 and charge the condenser 22 with a direct current with a positive potential on the tube side of the condenser and a negative potential on the side of the lead 24. Since the cathodes of the tubes 18 and 19 are connected together and to the positive side of the condenser 22 and since the grid of the tube 18 is connected to the negative side of the condenser 22, the grid-cathode voltage on the tube 18 is negative and of sufficient magnitude so that very little, if any, current flows in the plate circuit of the tube 18. As a result, little or no current flows through the coil of the relay 21 and the contacts 21a and 21b thereof remain closed. However, as soon as the music, speech, or other vibrations being reproduced cease, no voltage for charging the condenser 22 is supplied through the resistance 23 which is connected in parallel therewith between the lead 24 and the cathodes of the tubes. The time required for the condenser 22 to discharge is determined by the size of the condenser and the size of the resistance 23. These may be of any preselected sizes or one or both may be adjustable.

It has been found satisfactory to use a condenser and resistance such that the voltage across the condenser, and thus the grid-cathode voltage on the tube 18 diminishes in two seconds to a sufficiently low value so that the tube 18 passes enough current to energize the relay 21 and open the contacts 21a and 21b thereof. Such an operation shuts off the entire system until the cycle is re-initiated by the operation of the clock motor 7 and the cams 11 and 12.

Thus a system is started intermittently at regular intervals of five minutes by the clock motor and after the initiation of each interval, the operation continues for a period depending upon the length of the particular portion of the record to be broadcast during that interval.

Eventually, when the end of the record is reached, the wire must be rewound and this is effected automatically by the standard wire record reproducer. During the rewind period current is supplied through a rewind circuit through the coil of the relay 8 which causes the contacts 8a thereof to open and the contact 8b thereof to close. This establishes the circuit through the main motor 6 for maintaining it operative for the rewind operation but shuts down the remainder of the system, including the clock motor. At the end of the rewind period, the reproducing mechanism automatically stops and interrupts the current through the wires 26 so that the relay 8 is de-energized and returns to normal position. Thereupon the clock motor starts and the entire cycle is repeated.

While I have shown and described the device in connection with a wire record reproducing mechanism, it is apparent that it can be used with the other types of sound reproducing devices employing other types of records but, as mentioned, the wire record reproducer is advantageous in that it is not subject to vibrations and such outside influences and therefore can be operated during transportation on a vehicle.

If desired, instead of shutting down the entire system, the main motor 6 only may be shut down, leaving the power applied to the power supply 15 and amplifier 5.

The discharge interval of the condenser 22 and the record must be correlated so that there is a section of the record between successive recordations which reproduces no vibrations and each of such intermediate sections of the record must be of such length that they require a period for passing through the pick-up which is slightly more than the time required for the condenser to discharge sufficiently so that the relay 21 is operated to shut down the device. With the relay and condenser related so that only two seconds are required for discharge of the condenser to a value sufficiently low to operate the relay 21 and shut down the reproducer, there is no appreciable amount of the record which does not contain recorded subject matter.

Instead of the structure thus described, a similar structure may be utilized but controlled by a different type of change in the conditions of the vibrations being reproduced from the record. For example, the change of the conditions of the vibrations may be a change in frequency in which case the record is provided with portions intermediate the advertisements, music and the like to be reproduced for hearing with portions for causing vibrations of higher frequency than those employed in the other sections and preferably frequencies above the audible range. For such purposes, the general reproducing system, clock motor and the like are the same as heretofore described, but the shut-off mechanism is modified.

Figure 2:
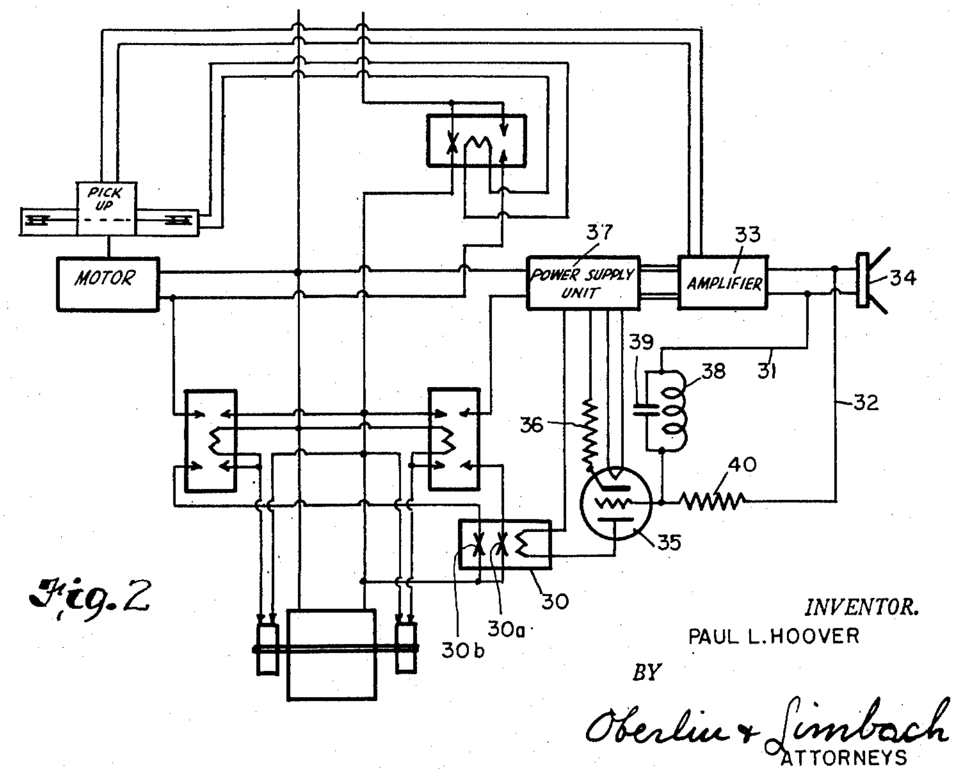
Figure 2 is a wiring diagram of a modified form of the mechanism in which the stopping of the record results from the reproduction of sounds from the record at frequencies out of the usual range of frequencies employed in the recordations to be intermittently reproduced, the frequencies preferably being above the audible frequencies.

As illustrated in Fig. 2, instead of the relay 21 a special relay 30 is provided. The relay 30 has an armature or moving part which is mechanically tuned to a particular frequency of vibration which is to be used on the record intermediate those portions which are to be reproduced for hearing. For example, the armature may be responsive or tuned to the frequency of a 5000 cycle current established through the coil of the relay and when so responsive, the normally closed contacts 30a and 30b thereof open but do not open at any other frequency. Under such conditions, a 5000 cycle tone or frequency would be provided on the record and, accordingly, would be reflected in the voltage changes across the lines 31 and 32 which correspond to the leads 24 and 25 heretofore described and which are connected preferably between the amplifier 33 and speaker 34. This voltage is amplified by a thermionic tube 35 and thereby impressed on the coil of the relay 30 which opens and shuts down the system in the same manner as heretofore described in connection with the relay 21.

For this purpose a resistor 36 is interposed between the power supply 37 and the plate of the tube 35 and is a normal cathode bias resistor which is necessary for the operation of the tube 35 as an amplifier. An inductance 38 and condenser 39 are connected in parallel with each other and this parallel connection is interposed between the grid of the tube 35 and the lead 31. The inductance 38 and condenser 39 are resonated to 5000 cycles. A resistor 40 is interposed in the lead 32 between the connection of the lead 32 with the amplifier 37 and the connection of the parallel circuit of the inductance 38 and the condenser 39 with the tube 35 and cooperates therewith to provide an electrical filter to render the system more selective to the 5000 cycle frequency.

It should be noted that the selection of 5000 cycles is arbitrary and for illustrative purposes as any frequency can be used so long as the resonant frequency of the relay 30, the circuit of the inductance 38 and condenser 39 and the tone on the wire are the same.

It is apparent from the foregoing description that a recorder using an electrical system of sound translation is advantageous in that the change in condition of the electrical vibrations produced by the record can be used effectively for control. On the other hand if the reproducer is not of the electrical type, it can be used to pick up the sound vibrations from the horn or voice box and amplify and use them for stopping the motor or record driving means, the clock being used to start the same.

I claim:

1. In combination, a sound reproducing device including a record driving mechanism and adapted to reproduce sound from a record, said record having certain portions to be reproduced for hearing and other portions therebetween for producing inaudible control vibrations in a device of predetermined frequency, amplifying means for the reproduced sound, means for starting said record driving mechanism, and means responsive to said predetermined frequency in vibrations when produced by the device from the record to stop the driving mechanism, said means comprising a relay operative by impulses of said frequency, a circuit for supplying said relay with vibrations obtained from the device, and frequency responsive amplifying means inserted in said circuit for amplifying vibrations of said frequency when present in said circuit.

2. The combination with a sound reproducing device including a record driving mechanism and adapted to reproduce sound from a record, intermittently operative starting means for the mechanism for starting the record driving mechanism intermittently, means operative to maintain the operation of the driving mechanism after it is started, and means to stop the driving mechanism, of a record having a portion to be reproduced for hearing and an adjacent signal portion, and means whereby said stopping means is rendered operative by the changed condition of the vibrations produced by the device from said record consequent upon the first portion becoming ineffective and the second portion becoming effective with respect to said sound reproducing device to stop the driving mechanism, and said last named means including an electric tube directly responsive to said vibrations.

3. The combination with a sound reproducing device including a record driving mechanism and adapted to reproduce sound from a record, and intermittently operative means for starting the record driving mechanism intermittently, of a record having certain portions to be reproduced for hearing and other portions therebetween for producing control vibrations in the device, means for stopping the record driving mechanism, and means whereby said stopping means is responsive only to the control vibrations for stopping the record driving mechanism.

4. The combination with a sound reproducing device including a record driving mechanism and adapted to reproduce sound from a record, and intermittently operative means for starting the record driving mechanism intermittently, of a record having certain portions to be reproduced for hearing and different portions therebetween, said portions to be reproduced for hearing requiring less time to be fully reproduced than the time between operations of said intermittently operative means, and means for stopping the record driving mechanism, and means whereby said stopping means is responsive to the said different portions for stopping the record driving mechanism, and said last named means including a grid-controlled electronic valve having its grid circuit connected to said device and influenced by said different portions.

5. The combination with an electronically operated sound reproducing device including an electrical record driving mechanism, timing means and associated circuits operative to initiate energization and initially operate the device intermittently at the end of relatively long periods, holding means operative to maintain said energization for a relatively short interval while predetermined vibrations are being produced by the device from a record, means whereby said holding means is rendered inoperative by a predetermined change in the condition of said vibrations to maintain said energization and thereby stop said energization.

6. The combination with a sound reproducing device including a record driving mechanism and an electric sound reproducing means and a circuit therefor, and adapted to reproduce sound from a record, timing means operative to start the driving mechanism intermittently, holding means to maintain the driving mechanism operative after it has been started, stopping means, and means whereby said stopping means is rendered operative when energized by predetermined voltage changes in the said circuit to render the holding means inoperative to maintain the record driving mechanism operative, and said stopping means including a grid-controlled tube having its grid circuit connected to said circuit and responsive to said voltage changer.

7. The combination with a sound reproducing device including a record driving mechanism, and an electric sound reproducing means and circuit therefor, and adapted to reproduce sound from a record, timing means operative to start the driving mechanism intermittently, holding means to maintain the driving mechanism operative after it has been started, stopping means, and means whereby said stopping means is rendered operative when energized by predetermined voltage changes in the said circuit to render the holding means inoperative to maintain the record driving mechanism operative, said stopping means including a condenser and resistance connected in parallel with each other and across said circuit and energized thereby, and means electrically connected to the coil of the relay and the said condenser and resistance and rendered operative by discharge of the condenser to energize the relay coil.

8. The combination with an electrically operable sound reproducing device adapted to reproduce sound from a record and including a record driving mechanism, an electric motor for driving said mechanism, a power circuit for the motor, and an electric sound reproducing circuit, timing means operative to close the power circuit for a predetermined interval and then to open said circuit, a by-pass circuit, means whereby said by-pass circuit is rendered operative when the power circuit is energized to maintain energization of the motor independently of the timing means, said by-pass circuit including a normally closed relay operable when energized to open the by-pass circuit, and means electrically connected to the sound reproducing circuit and to the normally closed relay and normally rendered inoperative by a predetermined electrical condition to permit energization of the relay and rendered operative in response to a predetermined change in said electrical condition to permit energization of said relay.

9. The combination with a sound reproducer adapted to reproduce sound from a record, and including a sound reproducing circuit, a record driving mechanism and a driving motor therefor, a timing device operative to connect the circuit to a source of power and then to disconnect the circuit while maintaining said motor disconnected from said source, said device including means operative to start said motor in timed relation with respect to said connection of said circuit to said source, holding means, means whereby said holding means is rendered operative upon connection of the circuit to maintain its connection to the power source after its disconnection by the timing device, and means rendered operative by a change in a predetermined electrical condition of the circuit to cause said holding means to disconnect the circuit and to stop the motor.

10. The combination with a sound reproducer adapted to reproduce sound from a record, and including a sound reproducing circuit, a record driving mechanism and a driving motor therefor, a motor circuit, a timing device operative to connect the sound reproducer to a source of power while maintaining said motor disconnected from said source, said device including means operative to connect said motor to said source in timed relation with respect to said connection of the sound reproducer to said source, and to connect the motor circuit to a source of power in a time delay relation thereto, and then to disconnect the circuits, holding means, means whereby said holding means is rendered operative upon connection of the circuits to maintain said connections to the power source after their disconnection by the timing device, and means rendered operative by a change in a predetermined electrical condition of the sound reproducing circuit to cause said holding means to disconnect the circuits.

11. In a sound reproducing system, a record, a pick-up mechanism, a driving means for said record, said record having a plurality of spaced unrelated recorded portions of relatively short length with much shorter signal portions interposed therebetween, said driving means driving said record so that said portions pass into cooperative relation with said pick-up in succession, a starting means for the driving means operative to start the record intermittently with the intervals between successive starts of long duration, relative to the time required to play the long portion of said record, current responsive means, and means whereby said current responsive means is rendered operative by said signal portions when said signal portions are driven into cooperative relation with said pick-up to stop said driving means, said current responsive means including a grid-controlled tube having its grid circuit energized by a portion of the current produced by said pick-up mechanism.

12. The combination with a sound reproducing device including a record driving mechanism and adapted to reproduce sound from a record, and intermittently operative means for starting the record driving means intermittently, of a record having certain spaced portions to be reproduced for hearing and signal portions interposed therebetween, means for stopping the record driving mechanism, and means whereby said stopping means is operative consequent upon one of said spaced portions becoming ineffective and one of said signal portions becoming effective with respect to said sound reproducing device for stopping the record driving mechanism, said last named means including a grid-controlled tube having its grid circuit connected to said sound reproducing device and energized by power derived therefrom.

13. The combination with a sound reproducing device including a record driving mechanism adapted to reproduce sound from a record, and means for starting said record driving mechanism, of time delay means operatively connected to the record driving mechanism and rendered operative in response to a cessation of predetermined vibrations produced by said device from a record to stop the record driving mechanism a predetermined time after said cessation, means for producing current vibrations upon the operation of said device, and said time delay means including a condenser in a circuit associated with said device and charge by said vibrating current and discharged upon cessation of said vibrating current.

PAUL L. HOOVER.

REFERENCES CITED

The following references are of record in the file of this patent:

UNITED STATES PATENTS

| Number | Name | Date |
|---|---|---|
| 1,852,877 | Gardner | Apr. 5, 1932 |
| 1,921,742 | Franklin | Aug. 8, 1933 |
| 1,937,919 | Smith | Dec. 5, 1933 |
| 1,987,544 | Wood et al. | Jan. 8, 1935 |
| 2,027,426 | Hammond, Jr., et al. | Jan. 14, 1936 |
| 2,031,605 | Jenkins et al. | Feb. 25, 1936 |
| 2,100,434 | Davis, Jr. | Nov. 30, 1937 |
| 2,116,314 | Jenkins et al. | May 3, 1938 |
| 2,142,591 | Ross | Jan. 3, 1939 |
| 2,232,925 | Mills | Feb. 25, 1941 |
| 2,252,327 | Lovett et al. | Aug. 12, 1941 |
| 2,396,409 | Berzer | Mar. 12, 1946 |
| 2,412,318 | Camras | Dec. 10, 1946 |
| 2,421,835 | Durant | June 10, 1947 |